(12) United States Patent
Allmendinger et al.

(10) Patent No.: US 10,290,122 B2
(45) Date of Patent: May 14, 2019

(54) MULTI-SPECTRAL CT IMAGING

(71) Applicants: Thomas Allmendinger, Forchheim (DE); Rainer Raupach, Heroldsbach (DE); Bernhard Schmidt, Fürth (DE); Harald Schöndube, Erlangen (DE)

(72) Inventors: Thomas Allmendinger, Forchheim (DE); Rainer Raupach, Heroldsbach (DE); Bernhard Schmidt, Fürth (DE); Harald Schöndube, Erlangen (DE)

(73) Assignee: Siemens Aktiengesellschaft, Münich (DE)

( * ) Notice: Subject to any disclaimer, the term of this patent is extended or adjusted under 35 U.S.C. 154(b) by 10 days.

(21) Appl. No.: 15/092,784

(22) Filed: Apr. 7, 2016

(65) Prior Publication Data

US 2016/0307340 A1 Oct. 20, 2016

(30) Foreign Application Priority Data

Apr. 14, 2015 (DE) .......................... 10 2015 206 630

(51) Int. Cl.
*G06T 1/00* (2006.01)
*G06T 11/00* (2006.01)

(52) U.S. Cl.
CPC ....... *G06T 11/008* (2013.01); *G06T 2211/408* (2013.01)

(58) Field of Classification Search
CPC ....... A61B 6/032; A61B 6/5258; A61B 6/548; A61B 6/4014; A61B 6/482;
(Continued)

(56) References Cited

U.S. PATENT DOCUMENTS 6,081,577 A * 6/2000 Webber ................ G01N 23/046
378/23
6,453,068 B1 * 9/2002 Li ........................... G06T 5/002
358/1.9
(Continued)

FOREIGN PATENT DOCUMENTS

CN 101308102 A 11/2008
CN 101566590 A 10/2009
(Continued)

OTHER PUBLICATIONS

Cai et al: "Feature-Driven Multilayer Visualization for Remotely Sensed Hyperspectral Imagery," IEEE Transactions on Geoscience and Remote Sensing, vol. 48 No. 9, pp. 3471-3481, Sep. 2010.
(Continued)

*Primary Examiner* — Jingge Wu
(74) *Attorney, Agent, or Firm* — Lempia Summerfield Katz LLC

(57) ABSTRACT

A multi-spectral CT imaging method, preferably a CT imaging method, is described. Spectrally resolved projection scan data is acquired from a region to be imaged of an examination object. The data is assigned to a plurality of pre-determined different partial spectra. Spectrally resolved image data is reconstructed with a plurality of attenuation values for each image point of the region to be imaged. The attenuation values are each assigned to one of the pre-determined different partial spectra. Furthermore, an extremal attenuation value is determined for each image point on the basis of the plurality of attenuation values. A representative image data set is determined such that the determined extremal attenuation value is assigned to each image point.

20 Claims, 5 Drawing Sheets

(58) Field of Classification Search
CPC ......... G06T 2207/10081; G06T 7/0012; G06T 2207/10024; G06T 11/008; G06T 11/001; G06T 11/005; G06T 2207/10116; G06T 2207/10152
See application file for complete search history.

(56) References Cited

U.S. PATENT DOCUMENTS

| | | | | |
|---|---|---|---|---|
| 2007/0249933 | A1* | 10/2007 | Krauss | A61B 5/4869 600/425 |
| 2008/0013672 | A1* | 1/2008 | Krauss | A61B 6/482 378/4 |
| 2009/0202167 | A1* | 8/2009 | Muijs | H04N 1/409 382/254 |
| 2010/0061608 | A1* | 3/2010 | Galant | G06T 7/11 382/128 |
| 2010/0198638 | A1* | 8/2010 | Deffenbaugh | G01V 11/00 705/308 |
| 2011/0229007 | A1* | 9/2011 | Jerebko | A61B 6/025 382/132 |
| 2012/0063662 | A1 | 3/2012 | Kwon et al. | |
| 2012/0183118 | A1* | 7/2012 | Halliburton | A61B 6/032 378/16 |
| 2012/0243764 | A1* | 9/2012 | Dey | A61B 6/032 382/131 |
| 2013/0022259 | A1* | 1/2013 | Kwon | G06T 5/009 382/132 |
| 2013/0027770 | A1 | 1/2013 | Ganser et al. | |
| 2014/0112581 | A1* | 4/2014 | James | G06T 5/006 382/167 |
| 2015/0164456 | A1* | 6/2015 | Takamatsu | A61B 6/482 378/4 |
| 2015/0379694 | A1* | 12/2015 | Goshen | A61B 6/032 382/195 |
| 2016/0007948 | A1* | 1/2016 | Isola | A61B 6/032 382/131 |
| 2016/0307340 | A1* | 10/2016 | Allmendinger | G06T 11/008 |
| 2016/0331352 | A1* | 11/2016 | Kawashima | A61B 8/12 |

FOREIGN PATENT DOCUMENTS

| | | |
|---|---|---|
| CN | 102853791 A | 1/2013 |
| CN | 102902052 A | 1/2013 |

OTHER PUBLICATIONS

German Office action for related German Application No. 10 2015 206 630.4, dated Jul. 17, 2015, with English Translation.
Rodrigues et al: "Multimodal Image Fusion Techniques for Medical Images Using Wavelets," International Journal of Research in Advent Technology, vol. 2, pp. 310-313, E-ISSN: 2321-9637, 2014.
Chinese Office Action for Chinese Application No. 201610220577.2, dated Apr. 3, 2018, with English Translation.

* cited by examiner

MULTI-SPECTRAL CT IMAGING

RELATED CASE

This application claims the benefit of DE 102015206630.4, filed on Apr. 14, 2015, which is hereby incorporated by reference in its entirety.

FIELD

The present embodiments relate to a multi-spectral CT imaging method. The embodiments also relate to an image data determining device and to a computed tomography system.

BACKGROUND

With the aid of modern imaging methods, two or three-dimensional image data is often created that can be used for visualizing an imaged examination object and also for further uses.

Frequently, the imaging methods are based on the detection of X-ray radiation, wherein "projection scan data" is generated. For example, projection scan data can be acquired with the aid of a computed tomography (CT) system. In CT systems, typically, a combination of an X-ray source and an oppositely arranged X-ray detector mounted on a gantry runs around a measurement space in which the examination object (which in the following is designated "patient" without any restriction of the generality) is situated. The center of rotation (also known as "isocenter") coincides with a "system axis" z. During one or two rotations, the patient is irradiated with X-ray radiation from the X-ray source, wherein projection scan data or X-ray projection data is acquired with the aid of the X-ray detector positioned opposite thereto.

The projection scan data, or "projection data" for short, is dependent, in particular, on the construction of the X-ray detector. X-ray detectors typically have a plurality of detector units that are usually arranged in a regular pixel array. The detector units each generate, for X-ray radiation falling on the detector units, a detector signal that is analyzed at particular time points with regard to intensity and spectral distribution of the X-ray radiation in order to draw conclusions about the examination object and to generate projection scan data.

Conventionally, CT image data has image points with gray scale values that correspond to the measured attenuation value at each individual image point of a region to be imaged. Where reference is made below to an image point, this is intended to mean, for example, a two-dimensional pixel or a three-dimensional voxel. The measured attenuation value is the value that the relevant object point in the region to be imaged contributes to the overall attenuation that the incident X-ray radiation has experienced. This attenuation value is given in Hounsfield units. Herein, a value of −1000 HU corresponds to an attenuation that is produced by air and 0 HU to an attenuation that matches the attenuation of water. Conventionally, the image data is represented as gray scale-encoded two-dimensional images.

In order to take account of the third dimension of a volume region to be imaged, various representational possibilities exist. For example, a plurality of two-dimensional images are represented adjoining one another. Herein, each of the two-dimensional images represents a slice of a three-dimensional volume. The two-dimensional images can also be depicted one after another, so that the volume imaged can be leafed through with a mouse or another controlling input device. In order to form the individual slice images, for example, three-dimensional image data material that is assigned to a slice can be reformatted. Herein, for example, averaging of the image data in the slice direction, i.e. in the direction perpendicular to the slice plane, is carried out and the calculated average is represented in a two-dimensional image assigned to the slice. Reformatting of this type is known as multi-planar reformatting (MPR). Alternatively, a calculation of the maximum or minimum value in the direction perpendicular to the slice plane can be carried out and the calculated maximum or minimum value can be represented in a two-dimensional image assigned to the slice. In the case of a representation of the maximum values, a procedure of this type can be referred to as a projection of the maximum intensity value (maximum intensity projection, MIP). In the case of a representation of the minimum values, a procedure of this type can be referred to as a projection of the minimum intensity value (minimum intensity projection, MinIP).

In a series of uses of CT systems, a plurality of data sets or projection data sets that relate to the same object are acquired from independent scans. Data sets of this type are recorded, for example, for the use of recordings with a plurality of energy thresholds, known as multi-energy scans. In the multi-energy scans, data of a quantum-counting detector is acquired with one or more energy thresholds, wherein different data sets are assigned to the respective energy ranges separate from the energy thresholds.

In this case, for each point of a region to be imaged, a plurality of attenuation values exist that are each assigned to one of the different data sets and, taken together, describe the spectral dependency of the attenuation values of the incident X-ray radiation. In principle, spectral dependencies can be characterized by the specification of different attenuation values for different spectra or spectral intervals or by the specification of the portions of different base materials at the respective measuring point. Herein, partial spectra, which together form the overall spectrum of the spectral dependency of the image data, are assigned to the base materials. The spectral dependency of the image data therefore corresponds to a fourth dimension in the data generated during the scan. Four-dimensional scan data can only be represented graphically with difficulty.

Conventionally, this four-dimensional data is divided into three-dimensional volume data that corresponds, respectively, to a spectral portion. The three-dimensional data separated according to spectral portion is separately displayed. However, a representation of this type of four-dimensional scan data is very unclear and complex.

SUMMARY AND DETAILED DESCRIPTION

It is therefore an object of the present embodiments, in the context of multi-spectral imaging, to generate an image data set that can be represented more clearly and also includes the essential spectral image information.

This object is achieved with a multi-spectral imaging method, by means of an image data determining device, and with a computed tomography system.

In the multi-spectral imaging method according to one embodiment, which can be a multi-spectral CT imaging method, spectrally resolved projection scan data is acquired from a region to be imaged of an examination object. The projection scan data is assigned to a plurality of predetermined different partial spectra. The partial spectra can correspond, for example, to frequency intervals that are defined by energy thresholds of X-ray detectors. The partial spectra can also be defined by spectral portions assigned to individual base materials. In the multi-spectral imaging method according to one embodiment, spectrally resolved image data is again reconstructed from the acquired projection scan data. This image data includes a plurality of attenuation values for each image point of the region to be imaged, wherein each image data item is assigned to one of the pre-determined different partial spectra. For example, not just one attenuation value but a plurality of attenuation values is assigned to each image point, depending on the partial spectra mentioned. In the method according to one embodiment, an extremal attenuation value is also determined for each image point on the basis of the plurality of attenuation values. The extremal attenuation value can be, for example, a minimum value or a maximum value (e.g., the spectral attenuation value among the spectral attenuation values assigned to one image point which represents a value of minimum attenuation or maximum attenuation). Finally, a representative image data set is generated wherein assigned to each image point is the extremal attenuation value determined for the individual image point. An image data set of this type offers compressed information regarding the structure to be imaged in the region to be imaged. If, for example, the respective maximum value of the attenuation values is selected as the extremal value, then an image with a favorable signal/noise ratio is generated. In addition, it can be assumed that the respective largest attenuation value of an image point represents the predominant material at this point and also best reflects structural features.

The image data determining device according to one embodiment, in particular for multi-spectral CT imaging, has an input interface for acquiring spectrally resolved projection scan data from a region to be imaged of an examination object. The projection scan data is assigned to a plurality of pre-determined different partial spectra. The image data determining device according to the embodiment also has a reconstruction unit for reconstructing spectrally resolved image data, which include a plurality of attenuation values assigned to pre-determined partial spectra for each image point of the region to be imaged. Part of the image data determining device according to the embodiment is also an attenuation value determining unit for determining an extremal attenuation value for each image point. In addition, the image data determining device according to the embodiment includes an image data set generating unit for generating a representative image data set wherein the extremal attenuation value determined is assigned to each image point.

The computed tomography system according to one embodiment has the image data determining device.

The essential components of the image data determining device according to one embodiment can be configured mainly in the form of software components. This applies in particular to the reconstruction unit, the attenuation value determining unit, and the image data set generating unit. In principle, however, these components can also be realized in part, especially if particularly fast calculations are to be performed, in the form of software-supported hardware, for example, FPGAs or the like. Similarly if, for example, a transfer of data from other software components is provided, the required interfaces can also be configured as software interfaces. However, the interfaces can also be configured as interfaces constructed with hardware controlled by suitable software.

In particular the image data determining device according to one embodiment can be part of a user terminal or a control device of a CT system.

A realization largely through software has the advantage that conventionally used control devices can also be upgraded by a software update in order to operate in the manner according to one or more embodiments. The object is therefore achieved with a suitable computer program product with a computer program that can be loaded directly into a memory storage unit of a control device of a computed tomography system, having program portions in order to carry out all the acts of the method according to the embodiments when the program is executed in the control device. A computer program product of this type can possibly comprise, apart from the computer program, additional constituent parts such as documentation and/or additional components including hardware components such as hardware keys (dongles etc.) for use of the software.

A computer-readable medium, for example a memory stick, a hard disk or another transportable or firmly installed data carrier, on which the program portions of the computer program that can be read in and executed by a computer unit of the control device are stored, can serve for transport to the control device and/or for storage on or in the control device. For this purpose, the computer unit can have one or more cooperating microprocessors or the like.

The dependent claims and the following description contain particularly advantageous embodiments and developments of the invention. Herein particularly, the claims of one claim category can also be further developed similarly to the dependent claims of another claim category. In addition, within the context of the invention, the various features of different exemplary embodiments and claims can also be combined to new exemplary embodiments. The scope of the present invention is defined solely by the appended claims and is not affected to any degree by the statements within this summary.

In one embodiment of the method, the partial spectra are assigned to different frequency intervals. As previously mentioned, detectors acquire X-ray radiation with a plurality of energy thresholds separated according to frequency intervals. These individual frequency intervals are assigned to different attenuation values according to the acquired count rate. The acquired attenuation values form a spectrum, which can also be broken down into partial spectra to each of which base materials are assigned. The coefficients determined during the breaking down represent information regarding the proportion of the base materials occurring in the image point.

In a preferred embodiment of the method, the extremal attenuation value is a maximum value. Thus, the largest attenuation value is meant as the number of attenuation values that are assigned to a common image point.

Alternatively, the extremal attenuation value can be a minimum value. Thus, the smallest attenuation value is meant as the number of attenuation values that are assigned to a common image point.

As an example of the representation of a minimum attenuation value, in a scan with an iodine contrast medium, through the selection of the "smallest" attenuation value, an effectively iodine-free image can be achieved across all thresholds and/or partial spectra, so that this representation resembles a native scan.

On selection of the "largest" attenuation value, in the event of the use of an iodine contrast medium, a maximum iodine contrast is achieved and thus an optimum contrast image is achieved.

Alternatively, a representation with the "smallest" attenuation values can be suitable for the imaging of calcium in vessels, since due to the high intrinsic contrast of calcium or bone, the blooming effect described in the literature can occur and this would also be reduced in such a representation and the true extent of the calcification can be better assessed.

In a particularly effective variant of the method according to one embodiment, during the generation of a representative image data set, in addition, an item of information regarding the extremal partial spectrum assigned to the extremal attenuation value determined is assigned to each of the image points. Differently expressed, information regarding the spectral origin of the extremal attenuation value is assigned to the representative image data set.

In an alternative variant of the method according to another embodiment, a spectral value is assigned to each of the partial spectra. A spectral value should be understood to be a variable on the basis of the value of which a conclusion can be drawn concerning the spectral origin of the respective attenuation value. This spectral value can be assigned, for example, to an energy threshold of a detector with a particular KV value. It can also be assigned to a particular base material.

It is particularly preferred that the additional information relating to the extremal partial spectrum assigned to the extremal attenuation value determined includes an extremal spectral value assigned to the respectively assigned extremal partial spectrum. In this variant, the extremal spectral value provides information regarding the spectral origin of the extremal attenuation value determined.

In a configuration of the method according to an embodiment which is particularly easy to realize, the representative image data set is configured such that the extremal attenuation values assigned to each image point are represented as gray-scale values.

In a particularly effective configuration of the method according to an embodiment, the representative image data set is configured such that the extremal attenuation values assigned to each image point are represented with different colors depending on the assigned extremal spectral value. The intensity of the colors is dependent on the size of the respective extremal attenuation value.

In an alternative embodiment of the method according to another embodiment, for each image point, an additional second-largest or second-smallest spectral attenuation value or further additional spectral attenuation values are determined. Furthermore, in the act of generating a representative image data set, the determined additional spectral attenuation values and their associated partial spectra and/or the spectral values corresponding to the partial spectra are also assigned to each image point.

The representative image data set can be represented, for example, in that the extremal and additional spectral attenuation values assigned to a common image point are represented with different colors depending on the respectively assigned spectral value. The intensity of the colors is dependent on the size of the respective spectral attenuation value, and the extremal and additional spectral attenuation values assigned to the common image point are represented together as color mixtures from the colors that are assigned to the extremal and additional spectral attenuation values assigned to the common image point. Differently expressed, in this embodiment, with the color mixtures, the spectral portions of an attenuation are represented in an image point by different colors which together result in a color mixture. Herein, the intensity of the individual colors is determined by the size of the assigned attenuation values. In this way, the image representation receives an additional dimension that gives information about the spectral components in each image point.

Preferably, the color values assigned to the respective spectral attenuation values include elementary colors.

The method according to one embodiment can also be modified in that the representative image data set generated is divided into a plurality of slices that are represented as two-dimensional image data. The two-dimensional representation is carried out as an MIP or MinIP or MPR representation.

BRIEF DESCRIPTION OF THE DRAWINGS

The invention will now be described again in greater detail making reference to exemplary embodiments as illustrated in the accompanying drawings, in which.

DETAILED DESCRIPTION

Figure 1:
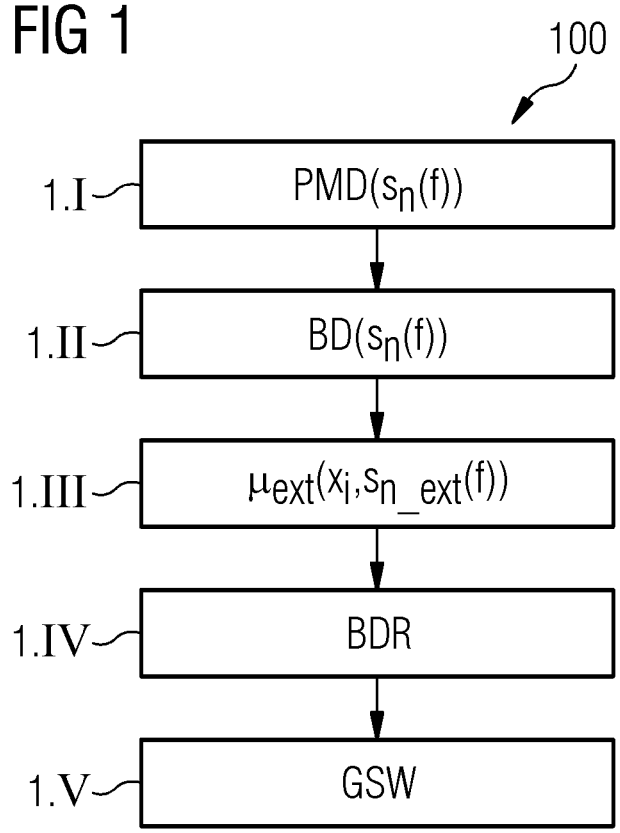
FIG. 1 is a flow diagram which illustrates a multi-spectral imaging method according to a first exemplary embodiment.

FIG. 1 illustrates a multi-spectral imaging method 100 according to a first exemplary embodiment. In act 1.I of the method 100, initially spectrally resolved projection scan data PMD ($s_n(f)$) is acquired from a region to be imaged VOI of an examination object O (see FIG. 5). For this purpose, acquisition control signals are transferred to a scanning unit of a CT system 1 (see FIG. 5) and projection scan data PMD is acquired. The projection scan data can be recorded, for example, with the aid of a CT detector with a plurality of energy thresholds. This projection scan data includes, for example, a plurality of independent projection scan data sets $PMD_n$, which are assigned to different partial spectra $s_n(f)$. These partial spectra $s_n(f)$ can be, for example, partial spectra simply divided by at least one threshold value. In this case, therefore, a frequency portion of the overall spectrum is assigned to each partial spectrum $s_n(f)$. The partial spectra can, however, also be broken down into partial spectra assigned to "base materials", the overlaying of which partial spectra results in the overall spectrum of the acquired projection scan data. In this case, instead of the assignment of the projection scan data sets $PMD_n$ to frequency portions, an assignment to individual base materials can be carried out. Both types of spectral break-down of the projection scan data sets PMD should be included by the formulation of the spectral break-down into projection scan data sets $PMD_n$.

In act 1.II, spectrally resolved image data $BD(s_n(f))$ is then reconstructed. A reconstruction should be understood in this regard to be a typical image data reconstruction of the independent projection scan data sets $PMD_n$ to image data, for example with the aid of a filtered back-projection. The image data BD can be divided into spectrally resolved image data sets $BD_n$, which include attenuation values ($\mu_n(x_i, s_n(f))$). The attenuation values are each assigned to one of the independent projection scan data sets $PMD_n$ and are location-dependent (i.e. each assigned to one image point $x_i$). Differently expressed, on division into N partial spectra (for example, if the detectors include N−1 energy thresholds), a set of N spectrally different attenuation values ($\mu_n(x_i,s_n(f))$) is therefore assigned to each image point $x_i$.

Now, in act 1.III, for each image point $x_i$, an extremal value ($\mu_{ext}(x_i,s_{n\_ext}(f))$) of the spectrally different attenuation values ($\mu_n(x_i,s_n(f))$) is determined. For example, this can be the attenuation value of the set of spectrally different attenuation values $\mu_n(x_i,s_n(f))$ that has the highest value among these.

In act 1.IV, a representative image data set BDR is generated that includes as attenuation values the extremal values $\mu_{ext}(x_i,s_{n\_ext}(f))$ determined in act 1.III.

In act 1.V, the image data determined is represented as gray scale values GSW, the gray level of each corresponding to the respective assigned extremal value $\mu_{ext}(x_i,s_{n\_ext}(f))$. The selected pictorial representation can clearly also be designated an MIP or a MinIP in the spectral direction.

Figure 2:
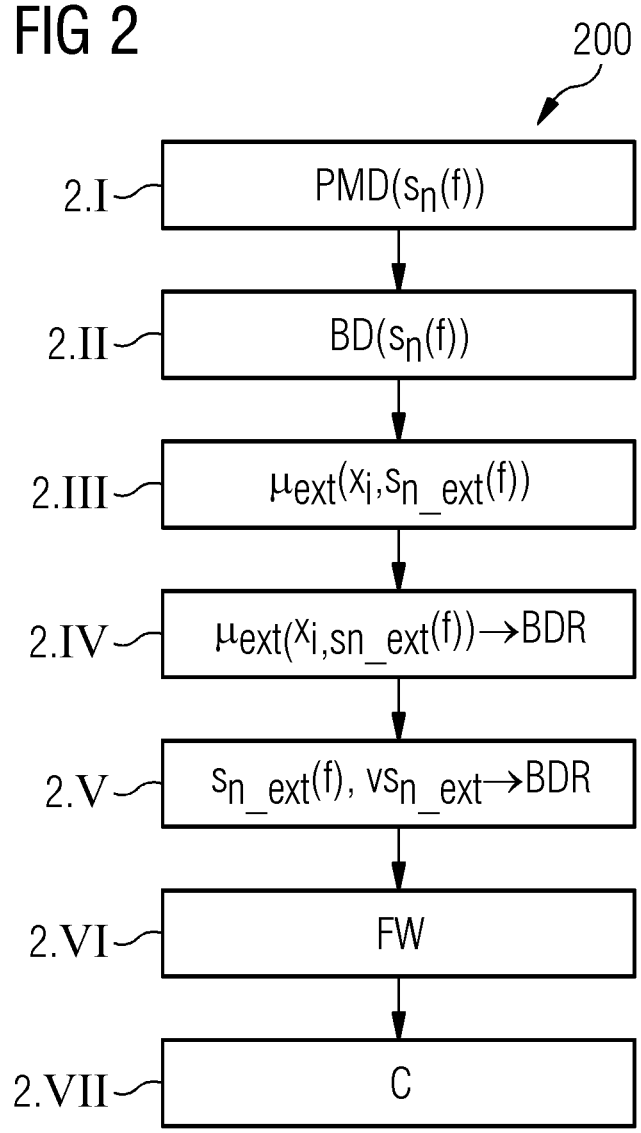
FIG. 2 is a flow diagram which illustrates a multi-spectral imaging method according to a second exemplary embodiment.

FIG. 2 illustrates a method 200 according to a second exemplary embodiment. In the method 200, in addition to the representation already selected in the first exemplary embodiment as an MIP or MinIP, in the spectral direction, the item of information concerning the spectral origin of the respective attenuation value can be represented in image form. In this way, the image data contains a type of additional spectral dimension.

Acts 2.I to 2.IV correspond to acts 1.I to 1.IV, so that reference is made in this regard to the description relating to FIG. 1. In act 2.V, in addition to the extremal attenuation values, further information $s_{n\_ext}$ relating to the spectral origin of the extremal values is added to the image data BDR. Furthermore, this spectral information $s_{n\_ext}$ is characterized by a spectral value $vs_{n\_ext}$. In act 2.VI, color values FW are assigned to each of the spectral values $vs_{n\_ext}$. For example, the color value FW corresponds to a color C of a color spectrum that corresponds or is assigned to one of the projection scan data sets $PMD_n$, which are assigned to different partial spectra $s_n(f)$. With this color C, therefore, the origin of the image data is shown. The origin should be understood to be the assignment to one of the projection scan data sets $PMD_n$ that are assigned, in each case, to a partial spectrum or a spectral portion. In act 2.VII, the image data determined is displayed as colored image data C according to the color values FW determined and the representative image data BDR. In the representation, the intensity of a color corresponds to the respective assigned spectral extremal value $\mu_{ext}(x_i,s_{n\_ext}(f))$ and the color of the respective spectral origin. The selected pictorial representation can clearly also be designated an MIP or a MinIP in the spectral direction.

Figure 3:
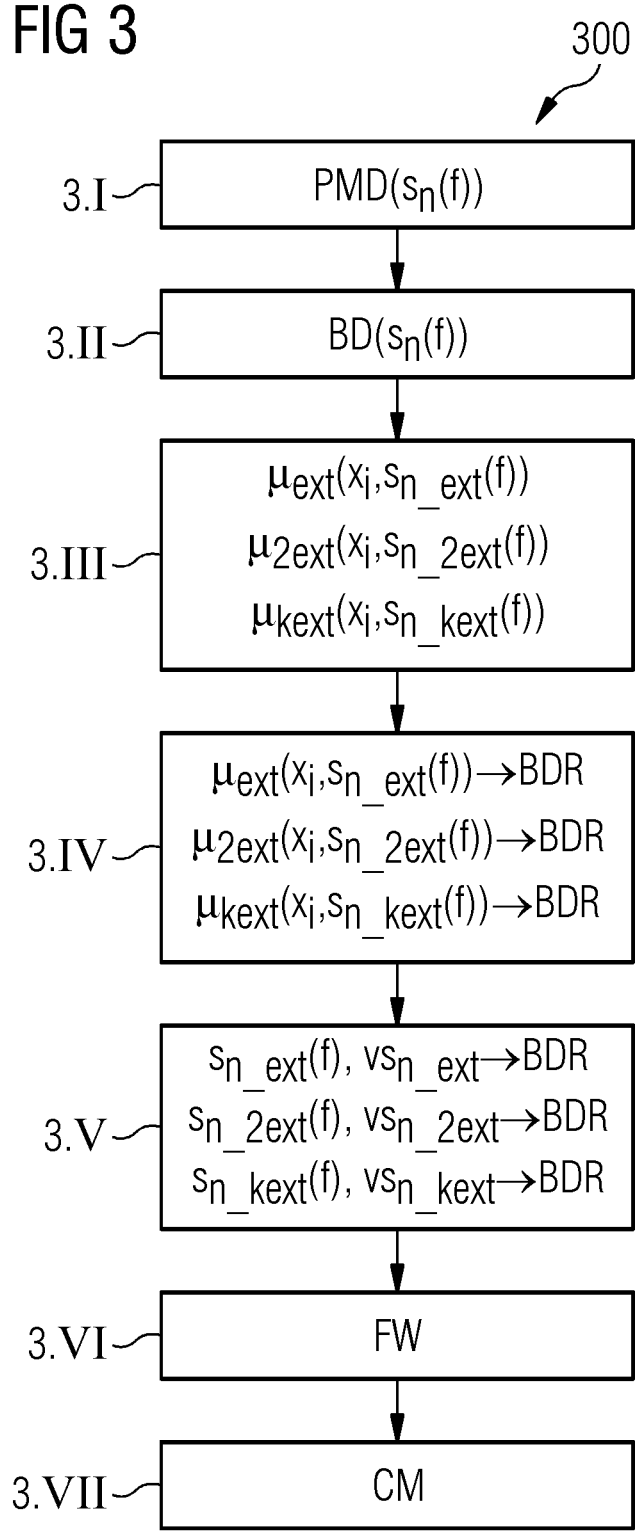
FIG. 3 is a flow diagram which illustrates a multi-spectral imaging method according to a third exemplary embodiment.

FIG. 3 illustrates a multi-spectral imaging method 300 according to a third exemplary embodiment. Acts 3.I to 3.II correspond to acts 1.I to 1.II or 2.I to 2.II, so that reference is made in this regard to the description relating to FIG. 1. In act 3.III, however, as distinct from the exemplary embodiments 100, 200 described above, during the generation of the representative image data set BDR, not only the extremal values $\mu_{ext}(x_i,s_{n\_ext}(f))$ of the data sets of attenuation values are determined, but also further additional spectral attenuation values $\mu_{2ext}(x_i,s_{n\_2ext}(f))$, $\mu_{kext}(x_i,s_{n\_kext}(f))$, which are each assigned to other projection scan data sets $PMD_n$ with other partial spectra $s_{n\_2ext}(f)$, $s_{n\_kext}(f)$. In the act 3.IV, in addition, the determined additional spectral attenuation values $\mu_{2ext}(x_i,s_{n\_2ext}(f))$, $\mu_{kext}(x_i,s_{n\_kext}(f))$ are assigned to each image point $x_i$. In act 3.V, the assigned partial spectra $s_{n\_2ext}(f)$, $s_{n\_kext}(f)$ thereof and the spectral values $vs_{2\_kext}$, $vs_{n\_kext}$ corresponding to the partial spectra $s_{n\_2ext}(f)$, $s_{n\_kext}(f)$ are assigned to the respective image points $x_i$. In act 3.VI, the respective image points are assigned color values FW depending on the determined spectral values $VS_{n\_ext}$, $VS_{2\_kext}$, $VS_{n\_kext}$. Since a plurality of color values FW is now assigned to each image point $x_i$, for each image point $x_i$, a color mixture CM of individual colors C that correspond to the determined color values FW is formed. In act 3.VII, the image data determined is displayed as images according to the representative image data BDR and the assigned color mixtures CM. In the representation, the intensity of a color C of the color mixture CM corresponds to the size of an associated assigned attenuation value $\mu_{2ext}(x_i,s_{n\_2ext}(f))$, $\mu_{kext}(x_i,s_{n\_kext}(f))$, $\mu_{ext}(x_i,s_{n\_ext}(f))$ and the color C of the color mixture CM corresponds to the respective spectral origin of the assigned attenuation value $\mu_{2ext}(x_i,s_{n\_2ext}(f))$, $\mu_{kext}(x_i,s_{n\_kext}(f))$, $\mu_{ext}(x_i,s_{n\_ext}(f))$. The method described is preferably carried out in an automated manner.

Figure 4:
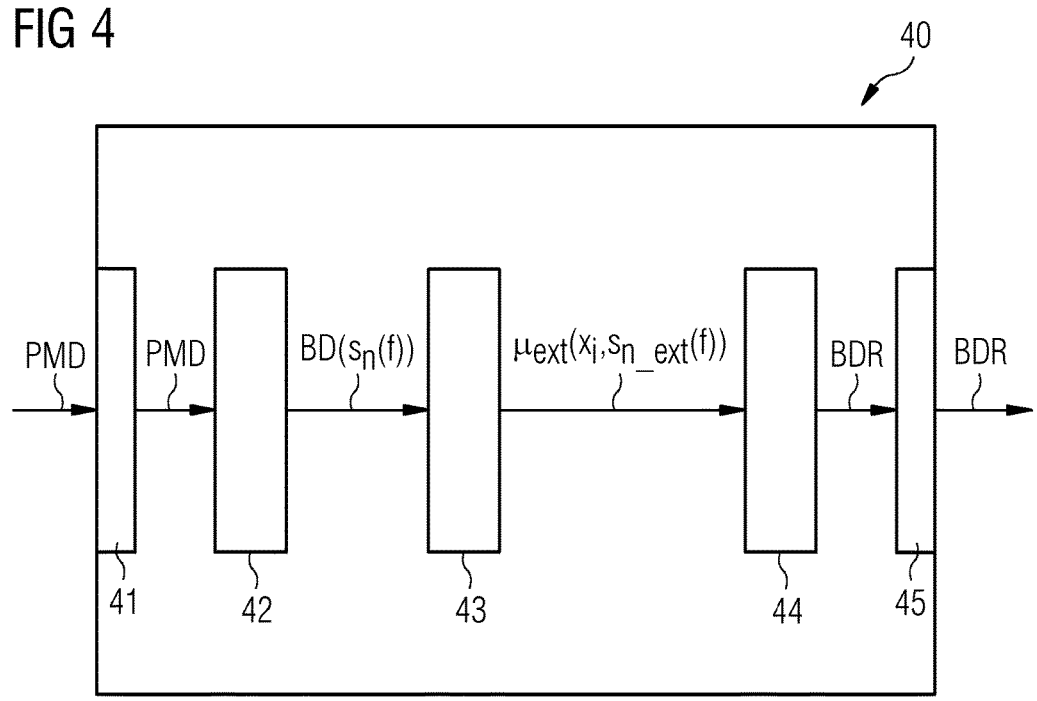
FIG. 4 is a block circuit diagram having an image data determining device according to an exemplary embodiment.
Figure 5:
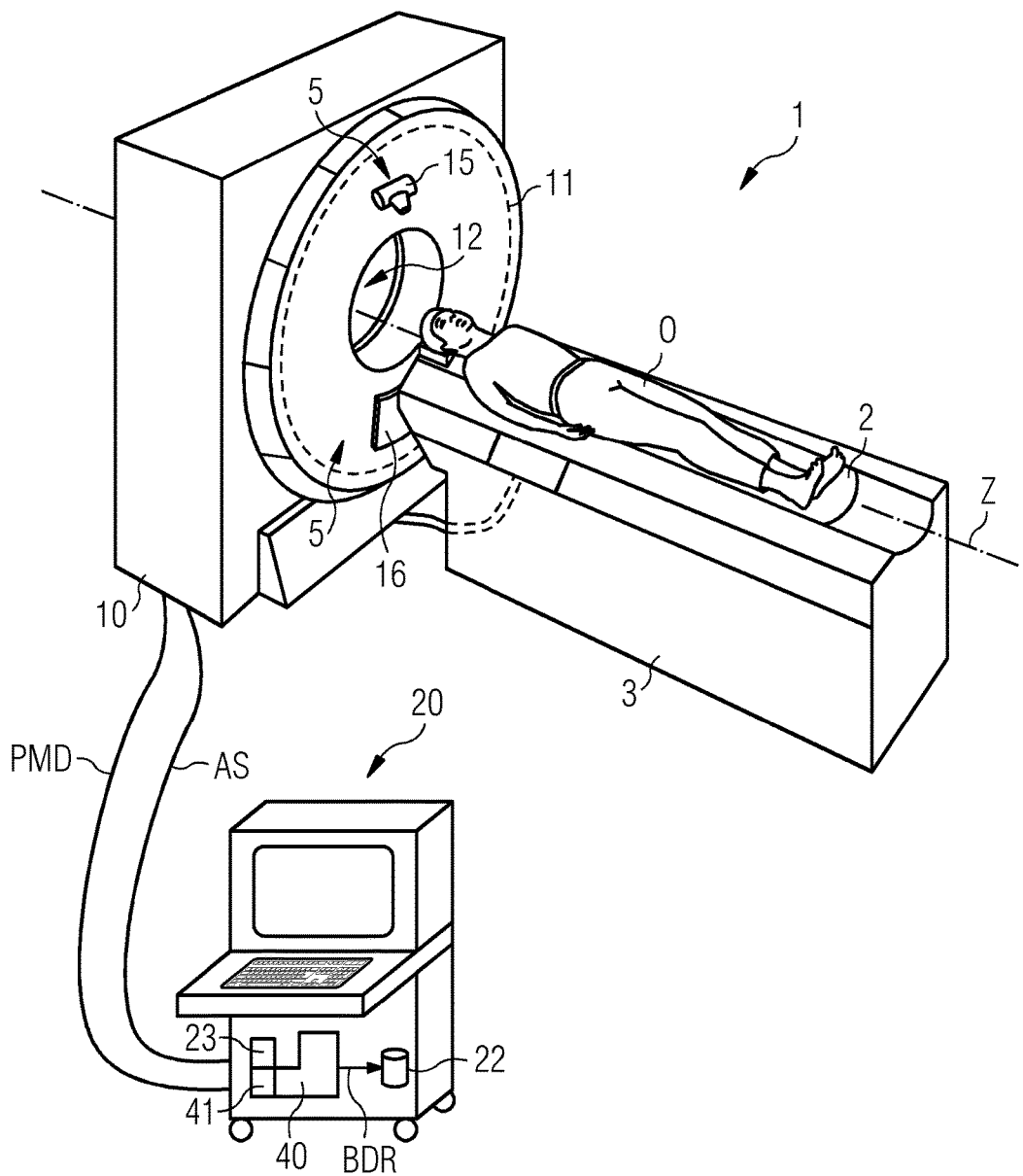
FIG. 5 is a schematic representation of a computed tomography system according to an exemplary embodiment.

FIG. 4 shows an image data determining device 40 for this purpose according to an exemplary embodiment. The image data determining device 40 can be, for example, part of a control device of a CT system 1 as shown in FIG. 5. The image data determining device 40 includes an input interface 41 that receives projection data PMD from a scanning device (see FIG. 5) of a CT system 1. The projection data PMD is spectrally resolved projection scan data PMD ($s_n(f)$) from a region to be imaged VOI of an examination object O. The data is assigned to a plurality of pre-determined different partial spectra $s_n(f)$. The projection scan data PMD($s_n(f)$) is transferred to a reconstruction unit 42 that reconstructs spectrally resolved image data BD($s_n(f)$). The image data includes a plurality of attenuation values $\mu_n(x_i,s_n(f))$ assigned to pre-determined partial spectra $s_n(f)$ for each image point $x_i$ of the region VOI to be imaged. The reconstructed image data BD($s_n(f)$) is transferred to an attenuation value determining unit 43, which determines at least one extremal attenuation value $\mu_{ext}(x_i,s_{n\_ext}(f))$ for each image point $x_i$. Subsequently, the extremal attenuation values $\mu_{ext}(x_i,s_{n\_ext}(f))$ are transferred to an image data set generating unit 44, which generates therefrom a representative image data set BDR. The determined extremal attenuation value $\mu_{ext}(x_i,s_{n\_ext}(f))$ is assigned to each image point $x_i$.

The representative image data set BDR is subsequently passed on to an output interface 45. The output interface 45 passes the representative image data set BDR to other units, for example, a storage unit or an image display unit, for example, a terminal or a screen.

FIG. 5 shows schematically a computed tomography system (CT system) 1 with an image data determining device 40 in accordance with an exemplary embodiment.

The CT system 1 substantially includes therein of a scanner 10 in which a projection data acquisition unit 5 with a detector 16 and an X-ray source 15 arranged opposite the detector 16 circulates on a gantry 11 about a scanning space 12. Situated in front of the scanner 10 is a patient positioning device 3 or patient table 3, the upper part 2 of which can be displaced relative to the scanner 10 with a patient O situated thereon in order to move the patient O through the scanning space 12 relative to the detector system 16. The scanner 10 and the patient table 3 are controlled by a control device 20 from which acquisition control signals AS come via a conventional control interface 23 in order to control the entire system in the conventional manner according to pre-determined scan protocols. Due to the movement of the patient O along the z-direction, which corresponds to the system axis z longitudinally through the scanning space 12, and the simultaneous circulation of the X-ray source 15, a helical path of the X-ray source 15 relative to the patient O results during the scan. The detector 16 always runs in parallel with and opposite to the X-ray source 15 in order to acquire projection scan data PMD, which is used for reconstructing volume image data and/or slice image data.

Similarly, a sequential scanning method can be carried out wherein a fixed position in the z-direction is approached and then, during a rotation, a partial rotation or a plurality of rotations at the z-position in question, the required projection scan data PMD is acquired in order to reconstruct a sectional image at this z-position or in order to reconstruct volume image data from the projection data of a plurality of z-positions.

The method according to other embodiment is, in principle, usable in other CT systems, for example, with a plurality of X-ray sources and/or detectors and/or with a detector forming a complete ring.

The projection scan data PMD (referred to hereinafter as raw data) acquired by the detector 16 is transferred via a raw data interface, which in this exemplary embodiment is the input interface 41 of the image data determining device 40, to the control device 20 or the image data determining device 40 contained therein. This raw data is then further processed in the image data determining device 40 in the manner described above. In this exemplary embodiment, the image data determining device 40 is realized in the control device 20 in the form of software on a processor.

Following the processing in the image data determining device 40, the representative image data BDR determined is transferred to a storage unit 22 and output, for example, to an output unit of the control device 20 of the CT system.

Finally, it should again be noted that the methods and devices described above are merely preferred embodiments and that the invention can also be varied by a person skilled in the art without departing from the scope of the invention as defined by the claims. The invention is not restricted to use in the medical domain, rather the invention can in principle also be used in the recording of CT images for other purposes, for example, for materials testing or the like. For the sake of completeness, it should be mentioned that the use of the indefinite article "a" or "an" does not preclude the relevant feature from also being present plurally. Similarly, the expression "unit" does not preclude this consisting of a plurality of components which may possibly also be spatially distributed.

It is intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

The invention claimed is:

1. A multi-spectral imaging method, the method comprising:
   acquiring spectrally resolved projection scan data from a region to be imaged of an examination object, the scan data being assigned to a plurality of pre-determined different partial spectra, the pre-determined different partial spectra based on energy thresholds of an x-ray detector;
   reconstructing spectrally resolved image data, the image data comprising a plurality of attenuation values for each image point of the region to be imaged, the attenuation values each being from respective ones of the pre-determined different partial spectra;
   determining an extremal attenuation value for each image point, the extremal attenuation value of each of the image points being an extremal one of the plurality of attenuation values for the respective image point;
   generating a representative image data set, wherein the determined extremal attenuation value of each image point is assigned to each respective image point of the representative image data set; and
   displaying an image from the determined extremal attenuation values of the representative image data set.

2. The method as claimed in claim 1, wherein reconstructing comprises assigning the partial spectra to the different frequency intervals or different base materials.

3. The method as claimed in claim 1, wherein determining comprises determine the extremal attenuation value as a maximum value or a minimum value.

4. The method as claimed in claim 1, wherein on generation of the representative image data set, in addition, an item of information relating to the partial spectrum assigned to the determined extremal attenuation value is assigned to each of the image points.

5. The method as claimed in claim 1, wherein a spectral value is assigned to each of the partial spectra.

6. The method as claimed in claim 1, wherein the representative image data set is divided into a plurality of slices that are represented as two-dimensional image data, wherein a two-dimensional representation is carried out as a spatial maximum intensity projection, minimum intensity projection, or multi-planar reconstruction representation.

7. The method as claimed in claim 3, wherein on generation of the representative image data set, in addition, an item of information relating to the partial spectrum assigned to the determined extremal attenuation value is assigned to each of the image points.

8. The method as claimed in claim 4, wherein a spectral value is assigned to each of the partial spectra.

9. The method as claimed in claim 7, wherein the item of information relating to the partial spectrum assigned to the determined extremal attenuation value comprises an extremal spectral value assigned to the respectively assigned extremal partial spectrum.

10. An image data determining device for multi-spectral CT imaging, the image data determining device comprising:
   an input interface configured to acquire spectrally resolved projection scan data from a region to be imaged of an examination object, the scan data assigned to a plurality of pre-determined different partial spectra; and
   a controller configured to reconstruct spectrally resolved image data comprising a plurality of attenuation values assigned to the pre-determined partial spectra for each image point of the region to be imaged, determine an extremal attenuation value for each image point from the plurality of attenuation values for the respective image point, the extremal attenuation value being a maximum for each image point, and generate a representative image data set, wherein the determined extremal attenuation value for each image point is assigned to each respective image point for the representative image data set.

11. The image data determining device of claim 10 wherein the controller is part of a computed tomography system.

12. A non-transitory computer-readable medium on which program portions which are readable and executable by a computer unit are stored, the program portions comprising instructions for:
acquiring spectrally resolved projection scan data from a region to be imaged of an examination object, the scan data being assigned to a plurality of pre-determined different partial spectra;
reconstructing spectrally resolved image data, the image data comprising a plurality of attenuation values for each image point of the region to be imaged, the attenuation values each being assigned to one of the pre-determined different partial spectra;
determining an extremal attenuation value for each image point ($x_i$) on the basis of the plurality of attenuation values for each of the respective image points;
generating a representative image data set, wherein the determined extremal attenuation value for each image point is assigned to each respective image point of the representative image data set; and
displaying an image from the determined extremal attenuation values of the representative image data set.

13. The method as claimed in claim 4, wherein the item of information relating to the partial spectrum assigned to the determined extremal attenuation value comprises an extremal spectral value assigned to the respectively assigned extremal partial spectrum.

14. The method as claimed in claim 1, wherein the representative image data set is represented such that the extremal attenuation values assigned to each image point are represented as gray-scale values.

15. The method as claimed in claim 4, wherein the representative image data set is represented such that the extremal attenuation values assigned to each image point are represented depending on the assigned extremal spectral value with different colors, an intensity of the colors depending on a size of the respective extremal attenuation value.

16. The method as claimed in claim 4, wherein for each image point, an additional second-largest or second-smallest spectral attenuation value or further additional spectral attenuation values are determined and in the act of generating a representative image data set, in addition, the determined additional spectral attenuation values and the partial spectra assigned to the additional spectral attenuation values and/or the spectral values corresponding to the partial spectra are assigned to each image point.

17. The method as claimed in claim 4, wherein the representative image data set is represented such that the extremal and additional spectral attenuation values assigned to a common image point are represented depending on the respectively assigned spectral value with different colors, an intensity of the different colors being dependent on the size of the respective spectral attenuation value, and the extremal and additional spectral attenuation values assigned to the common image point are represented together as color mixtures of the colors assigned to the extremal and additional spectral attenuation values assigned to the common image point.

18. The method as claimed in claim 4, wherein the representative image data set is represented such that the extremal attenuation values assigned to each image point are represented as gray-scale values.

19. The method as claimed in claim 7, wherein the representative image data set is represented such that the extremal attenuation values assigned to each image point are represented depending on the assigned extremal spectral value with different colors, an intensity of the colors depending on a size of the respective extremal attenuation value.

20. The method as claimed in claim 7, wherein for each image point, an additional second-largest or second-smallest spectral attenuation value or further additional spectral attenuation values are determined and in the act of generating a representative image data set, in addition, the determined additional spectral attenuation values and the partial spectra assigned to the additional spectral attenuation values and/or the spectral values corresponding to the partial spectra are assigned to each image point.

* * * * *